(12) United States Patent
Chizever et al.

(10) Patent No.: US 12,431,780 B2
(45) Date of Patent: Sep. 30, 2025

(54) MAGNETIC BRAKING SYSTEM FOR DESCENDING PAYLOADS

(71) Applicant: Applied Research Associates, Inc., Albuquerque, NM (US)

(72) Inventors: Hirsch M. Chizever, Beavercreek, OH (US); Paige S. Ahearn, Dayton, OH (US); Michael B. Miller, Vandalia, OH (US); Daniel S. Weile, Newark, DE (US); Jason A. Janét, Raleigh, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 292 days.

(21) Appl. No.: 18/212,765

(22) Filed: Jun. 22, 2023

(65) Prior Publication Data
US 2024/0136907 A1  Apr. 25, 2024
US 2024/0235358 A9  Jul. 11, 2024

Related U.S. Application Data

(60) Provisional application No. 63/354,834, filed on Jun. 23, 2022.

(51) Int. Cl.
*H02K 49/04*  (2006.01)
*A62B 1/14*  (2006.01)

(52) U.S. Cl.
CPC ............ *H02K 49/043* (2013.01); *A62B 1/14* (2013.01)

(58) Field of Classification Search
CPC ...... H02K 49/043; A62B 1/14; A62B 35/0075
See application file for complete search history.

(56) References Cited

U.S. PATENT DOCUMENTS

| | | | |
|---|---|---|---|
| 8,025,131 B1 * | 9/2011 | Boren | A63G 21/22 188/165 |
| 8,272,476 B2 * | 9/2012 | Hartman | A62B 1/08 182/5 |
| 10,022,570 B2 | 7/2018 | Krupp et al. | |
| 2021/0086002 A1 * | 3/2021 | Bailey | A62B 1/10 |

OTHER PUBLICATIONS

Der-Ming Ma, et al., "The Design of Eddy-Current Magnet Brakes", Department of Aerospace Engineering, Tamkang University, Danshuei, Taiwan 25137, Republic of China; Article in Transactions—Canadian Society for Mechanical Engineering; Mar. 2011; https://www.researchgate.net/publication/266246472.

\* cited by examiner

*Primary Examiner* — Tulsidas C Patel
*Assistant Examiner* — Mohammed Ahmed Qureshi
(74) *Attorney, Agent, or Firm* — Erise IP, P.A.

(57) ABSTRACT

Systems and methods for a magnetic braking system for controlling the descent of a payload against gravity are disclosed herein. The magnetic braking system may allow for a user to descend along a descending structure, such as a rope, hands-free. A plurality of conductive bands, comprising a non-ferromagnetic material, may be affixed to an exterior of the descending structure. The payload may be connected to the descending structure via a lanyard having a collar that circumferentially attaches to the descending structure. The collar may comprise magnetic assemblies arranged as a linear Halbach array. As the collar translates past the conductors, eddy currents may be generated within the conductive bands, resulting in a repelling magnetic field that may provide a braking force that acts upon the collar, thereby slowing the descent of the payload.

20 Claims, 6 Drawing Sheets

MAGNETIC BRAKING SYSTEM FOR DESCENDING PAYLOADS

CROSS REFERENCE TO RELATED APPLICATIONS

This non-provisional patent application claims prior benefit, with regard to all subject matter, of U.S. Provisional Patent Application No. 63/354,834, filed Jun. 23, 2022, and titled "MAGNETIC BRAKING SYSTEM FOR DESCENDING PAYLOADS". The identified earlier-filed provisional patent application is hereby incorporated by reference in its entirety.

BACKGROUND

1. Field

Embodiments of the present disclosure relate to braking systems. More specifically, embodiments of the present disclosure relate to magnetic braking systems for providing a controlled descent against gravity for payloads. Such payloads may include, but are not limited to, humans, animals, or materiel.

2. Related Art

Fast-roping is a deployment technique used by military personnel, SWAT teams, firefighters, and other emergency personnel in which personnel descend out of aircraft via a thick rope (e.g., having a diameter of about two inches) known as a fast rope. Fast roping allows for the deployment of personnel when the aircraft cannot land, such as due to poor terrain or enemy combatants. To descend a fast rope, a user grabs onto the fast rope with their hands (and sometimes their feet) and slides down the fast rope, utilizing friction to slow their descent. Because the user must grab onto the fast rope with their hands to descend, the user is exposed and unable to utilize weaponry during the descent, which decreases the safety of the descent. Further, heat generated from the friction can cause the user to release their hands from the fast rope, which may lead to injury to themselves and others in the event of a fall.

What is needed is a hands-free braking system for controlling the descent of a payload against gravity. Furthermore, what is needed is a magnetic braking system that can be configured by the user to provide braking at discrete locations along a descending structure.

SUMMARY

Embodiments of the present disclosure solve the above-mentioned problems by providing systems and methods for controlling the descent of a payload against gravity using a magnetic braking system. The magnetic braking system may utilize eddy current braking produced from a moving magnetic field translating past a stationary conductor. The magnetic braking system may comprise a lanyard that is configured to connect a payload to a descending structure, such as a fast rope. The lanyard may comprise a collar at a first end and a connector at a second end. The collar may house a plurality of magnetic assemblies. Each magnetic assembly may be arranged as a vertically-oriented linear Halbach array. The collar may be configured to attach to the descending structure, and the connector may couple to the payload. As the collar travels down the fast rope, the linear Halbach arrays therein interact with the plurality of conductors, and eddy currents are formed within the conductors. A magnetic field within the linear Halbach array attempts to repel the eddy currents, thereby providing a braking force opposing a gravitational force acting on the payload, thereby slowing the descent of the payload. The braking force may be configured by adjusting the cross-sectional area of the magnets, the incident magnetic field, the conductivity of the conductive bands, the thickness of the conductive bands, the length of the conductive bands, the distance between the conductive bands, or any combination thereof.

In some aspects, the techniques described herein relate to a magnetic braking system for controlling a descent of a payload, including: a plurality of conductive bands configured to be coupled with a descending structure and distributed longitudinally along the descending structure; and a lanyard for connecting the payload to the descending structure, including: a collar at a first end, the collar configured to attach to the descending structure, wherein the collar includes a plurality of magnet assemblies, wherein upon descent of the payload via the magnetic braking system, the plurality of magnet assemblies induces eddy currents within the plurality of conductive bands, thereby generating a braking force to decelerate the payload during the descent; and a second end including a connector for connecting to the payload.

In some aspects, the techniques described herein relate to a magnetic braking system, wherein each magnet assembly of the plurality of magnet assemblies includes a first side and a second side opposite the first side, wherein each magnet assembly is arranged as a linear Halbach array to enhance a magnetic flux density of the magnet assembly on the first side and reduce the magnetic flux density on the second side, and wherein the first side is oriented towards a center of the collar.

In some aspects, the techniques described herein relate to a magnetic braking system, wherein the plurality of magnet assemblies includes four magnet assemblies, and wherein the plurality of magnet assemblies are spaced equidistantly within the collar.

In some aspects, the techniques described herein relate to a magnetic braking system, wherein the plurality of conductive bands is distributed longitudinally along the descending structure at a plurality of discrete locations to generate the braking force on the collar at each discrete location.

In some aspects, the techniques described herein relate to a magnetic braking system, wherein the collar includes: a hinge and a clamshell clamp for attaching to the descending structure; and a plurality of cavities configured to house the plurality of magnet assemblies.

In some aspects, the techniques described herein relate to a magnetic braking system, wherein each conductive band includes a proximal end and a distal end, and wherein each conductive band includes a tapered diameter that increases from the proximal end to the distal end to control deceleration impulses as the collar approaches the proximal end.

In some aspects, the techniques described herein relate to a magnetic braking system, further including: a retrieval system disposed proximate to a distal end of the descending structure and configured to propel the collar from the distal end to a proximal end of the descending structure, the retrieval system including: a spring; at least one wheel configured to compress the spring when rotated by the collar, wherein releasing the spring causes the collar to be propelled from the distal end of the descending structure to the proximal end of the descending structure.

In some aspects, the techniques described herein relate to a magnetic braking system, wherein the lanyard includes an additional collar at the first end to increase a magnitude of the braking force.

In some aspects, the techniques described herein relate to a magnetic braking system, wherein the plurality of conductive bands is configured to be coupled to an exterior of the descending structure.

In some aspects, the techniques described herein relate to a method for controlling a descent of a payload using a magnetic braking system, including: providing a plurality of conductive bands, each conductive band of the plurality of conductive bands including a non-ferromagnetic metal; providing at least one lanyard, the at least one lanyard including: a collar at a first end, the collar including a plurality of magnet assemblies and configured to attach to a descending structure; and a connector at a second end configured to attach to the payload; affixing the plurality of conductive bands at a plurality of discrete positions along an exterior of the descending structure; and attaching the collar to the descending structure and the connector to the payload to connect the payload to the descending structure, wherein when the payload descends along the descending structure, the plurality of conductive bands interacts with the plurality of magnet assemblies to generate eddy currents, and wherein the eddy currents oppose a magnetic field of the plurality of magnet assemblies, providing a braking force to decelerate the descent of the payload.

In some aspects, the techniques described herein relate to a method, further including attaching an additional lanyard to the payload to increase a magnitude of the braking force.

In some aspects, the techniques described herein relate to a method, wherein the method further includes: providing an additional descending structure; and attaching an additional collar of the additional lanyard to the additional descending structure to increase a magnitude of the braking force applied to the payload.

In some aspects, the techniques described herein relate to a method, further including affixing an additional conductive band of the plurality of conductive bands adjacent to a discrete position of the plurality of discrete positions to increase a length along the descending structure that the braking force is applied to the payload.

In some aspects, the techniques described herein relate to a magnetic braking system for controlling a descent of a payload, including: a plurality of conductive bands configured to be circumferentially affixed to an exterior of a fast rope and configured to be distributed longitudinally along the fast rope; and a lanyard configured to connect the payload to the fast rope, the lanyard including: a collar at a first end of the lanyard, the collar configured to attach to the fast rope, wherein the collar includes a plurality of magnet assemblies configured to generate eddy currents within the plurality of conductive bands as the collar translates along the fast rope, wherein the eddy currents oppose a magnetic field of each magnet assembly of the plurality of magnet assemblies, providing a braking force for decelerating the payload, wherein each magnet assembly of the plurality of magnet assemblies is formed as a linear Halbach array including a strong side magnetic field oriented towards the plurality of conductive bands; and a connector at a second end of the lanyard, the connector configured to attach to the payload.

In some aspects, the techniques described herein relate to a magnetic braking system, wherein each conductive band of the plurality of conductive bands includes a longitudinal taper to reduce impulse velocity of the descent.

In some aspects, the techniques described herein relate to a magnetic braking system, wherein the plurality of magnet assemblies includes four magnet assemblies, and wherein the four magnet assemblies are spaced equidistantly within the collar.

In some aspects, the techniques described herein relate to a magnetic braking system, wherein each conductive band of the plurality of conductive bands includes one of copper, stainless steel, or aluminum.

In some aspects, the techniques described herein relate to a magnetic braking system, wherein each conductive band of the plurality of conductive bands includes a proximal end and a distal end, and wherein a width of each conductive band increases from the proximal end to the distal end.

In some aspects, the techniques described herein relate to a magnetic braking system, wherein the connector includes one of a carabiner, a maillon, a lobster clasp, a rebar hook, or a snap hook.

In some aspects, the techniques described herein relate to a magnetic braking system, wherein the lanyard includes an additional collar at the first end configured to attach to the fast rope and to increase a magnitude of a braking force on the payload.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 1 illustrates a magnetic braking system for some embodiments;

FIG. 2A schematically illustrates the interactions between a collar and a conductive band of the magnetic braking system for some embodiments;

Figure 1:
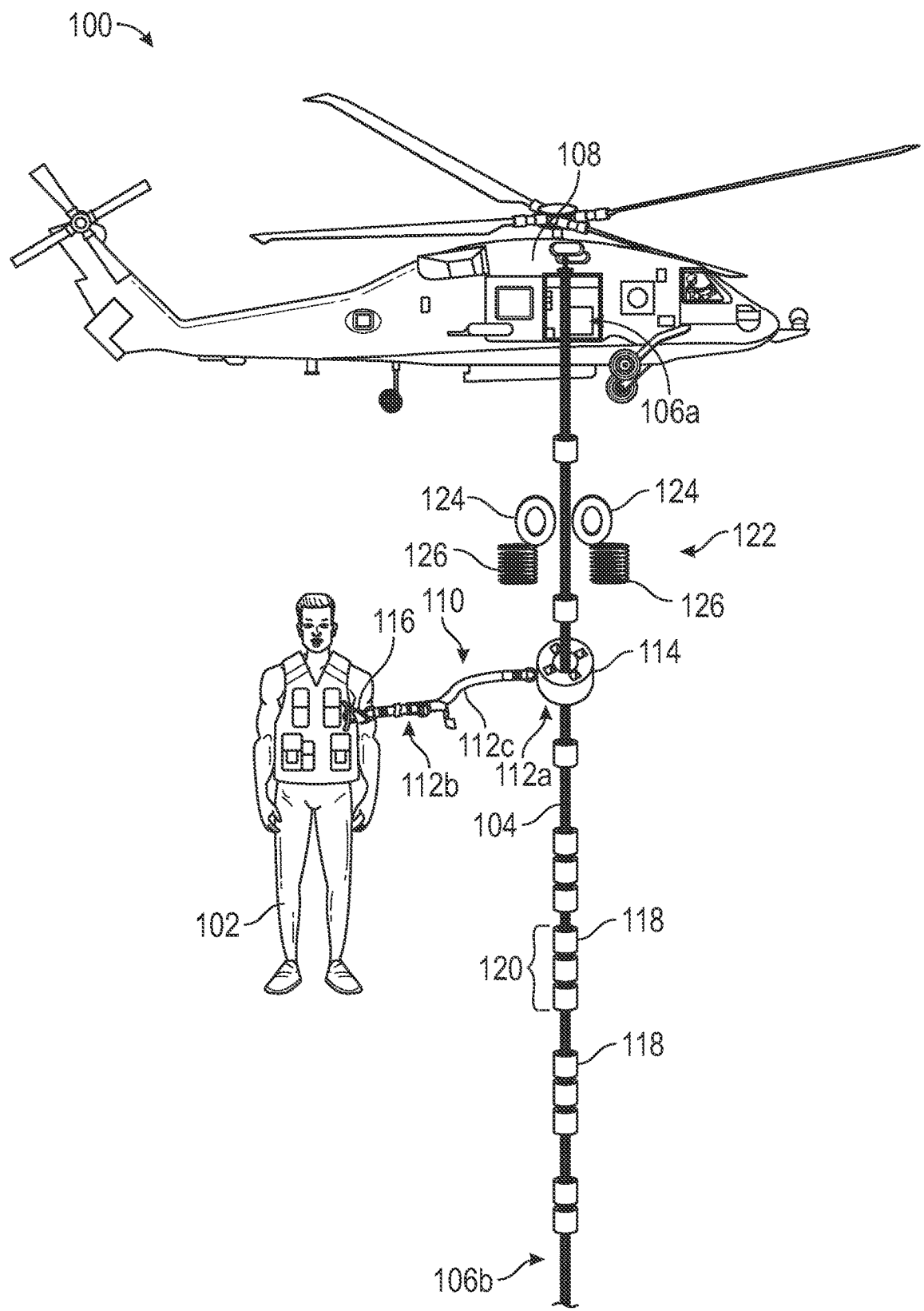

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments described herein are generally directed towards a magnetic braking system for controlling the descent of a payload against gravity. The magnetic braking system may utilize eddy current braking to slow the descent of the payload. The payload (e.g., a person or an object) may descend along a descending structure (e.g., a rope). The payload may be connected to the descending structure via a lanyard that may comprise a collar at a first end and a connector at a second end. The collar may be attached to the descending structure, and the connector may be attached to the payload, thereby connecting the payload to the descending structure. The collar may comprise a plurality of magnet assemblies therein. Each magnet assembly may be formed as a vertically-oriented linear Halbach array. Conductors, in the form of conductive bands, may be disposed along the length of the descending structure. As the collar descends along the descending structure, the relative motion between the magnet assemblies and the conductive bands results in the generation of eddy currents within the conductive bands. The eddy currents generate a corresponding, opposing magnetic field in the conductive bands (as described by Lenz's law), providing a braking force that works to slow the descent of the payload.

SYSTEM OVERVIEW

FIG. 1 illustrates a magnetic braking system 100 for controlling descent against gravity for a payload 102 for some embodiments. System 100 may be used in military applications, such as when military personnel are deploying using a fast rope, or for delivery of materiel, for example. Similarly, system 100 may be used to descend from heights and/or as a fall-arrest system for rock climbing, tower climbing, utility work, cave descending, lowering furniture, and the like. It will be appreciated the numerous use cases of system 100 for providing a controlled descent against gravity for a payload. When payload 102 is a person, system 100 may allow the person to descend hands-free. Such a hands-free system is advantageous as it allows the user to perform actions while descending. For example, military personnel often fast rope into dangerous environments. Providing a hands-free fast rope system allows for the military personnel to operate weaponry and/or perform other operations during their descent. As discussed below, system 100 may utilize the braking force provided by eddy currents generated as a moving magnetic field translates past a stationary conductor. The magnitude of the braking force may be influenced by the following factors: the material of the magnet, which correlates to the density of the magnetic flux; the shape of the magnet, which correlates to the distribution of the magnetic field; the area of the braking force; the distance between the magnet and the conductive bands; the sizes of the magnet and the conductive bands; the conductivity of the conductive band; the length of the conductive bands, the distance between the conductive bands; and the relative velocity of the magnet and the conductor. Each of these factors, which are discussed further below, may be configured by an operator of system 100 to realize a desired descent profile for payload 102.

Payload 102 may descend along a descending structure 104, which may be a rope, a fast rope, a utility pole, a metal pipe, or the like. Broadly, descending structure 104 may be any object on which the collar and conductive bands (described below) are attached. For example, descending structure 104 may be a rope for descending into a cave or canyon. As another example, descending structure 104 may be a metal pipe or rope disposed along an exterior of a high-rise building, and system 100 may be used for egress therefrom. Descending structure 104 may comprise a proximal end 106a and a distal end 106b. Proximal end 106a may be secured to a supporting structure 108. Supporting structure 108 may take various forms based on the use case of system 100. As one example, for delivering materiel or deploying military personnel, supporting structure 108 may be a helicopter, as illustrated in FIG. 1. As another example, for a rock climbing environment, supporting structure 108 may be the top of a rock climbing wall. Similarly, a utility pole, to which a rope is coupled, may be utilized as supporting structure 108 for use of system 100 in such embodiments. Any object or structure that supports descending structure 104 may be used as supporting structure 108 without departing from the scope hereof. In some embodiments, distal end 106b is also secured to a supporting structure, such as the ground or a rooftop, for example. In other embodiments, distal end 106b is unsecured. In some embodiments, distal end 106b is configured to prevent the collars from falling off descending structure 104. For example, when descending structure 104 is a rope, distal end 106b may be tied into a knot or present a removably fixed stop (not shown), to prevent the collars from falling off.

A lanyard 110 may be removably attachable to descending structure 104 at a first end 112a and to payload 102 at a second end 112b. First end 112a may comprise a collar 114, and second end 112b may comprise a connector 116. Collar 114 may be configured to couple to descending structure 104. In some embodiments, collar 114 couples substantially concentrically with descending structure 104. Collar 114 may couple to descending structure 104 such that collar 114 is concentric about conductive bands 118 and descending structure 104. A middle section 112c may extend from first end 112a to second end 112b. Middle section 112c may comprise a strong, lightweight material capable of supporting the weight of payload 102. For example, when payload 102 is a person, middle section 112c may be formed from a material such as nylon, polyester, galvanized steel, KEVLAR®, or the like. As another example, for delivery of materiel, a stiffer and/or stronger material, such as a steel cable may be used for middle section 112c. In some embodiments, a plurality of lanyards 110 are provided at proximal end 106a. For example, in a fast-roping application, at least one lanyard 110 may be provided for each personnel deploying out of the aircraft.

Figure 5:
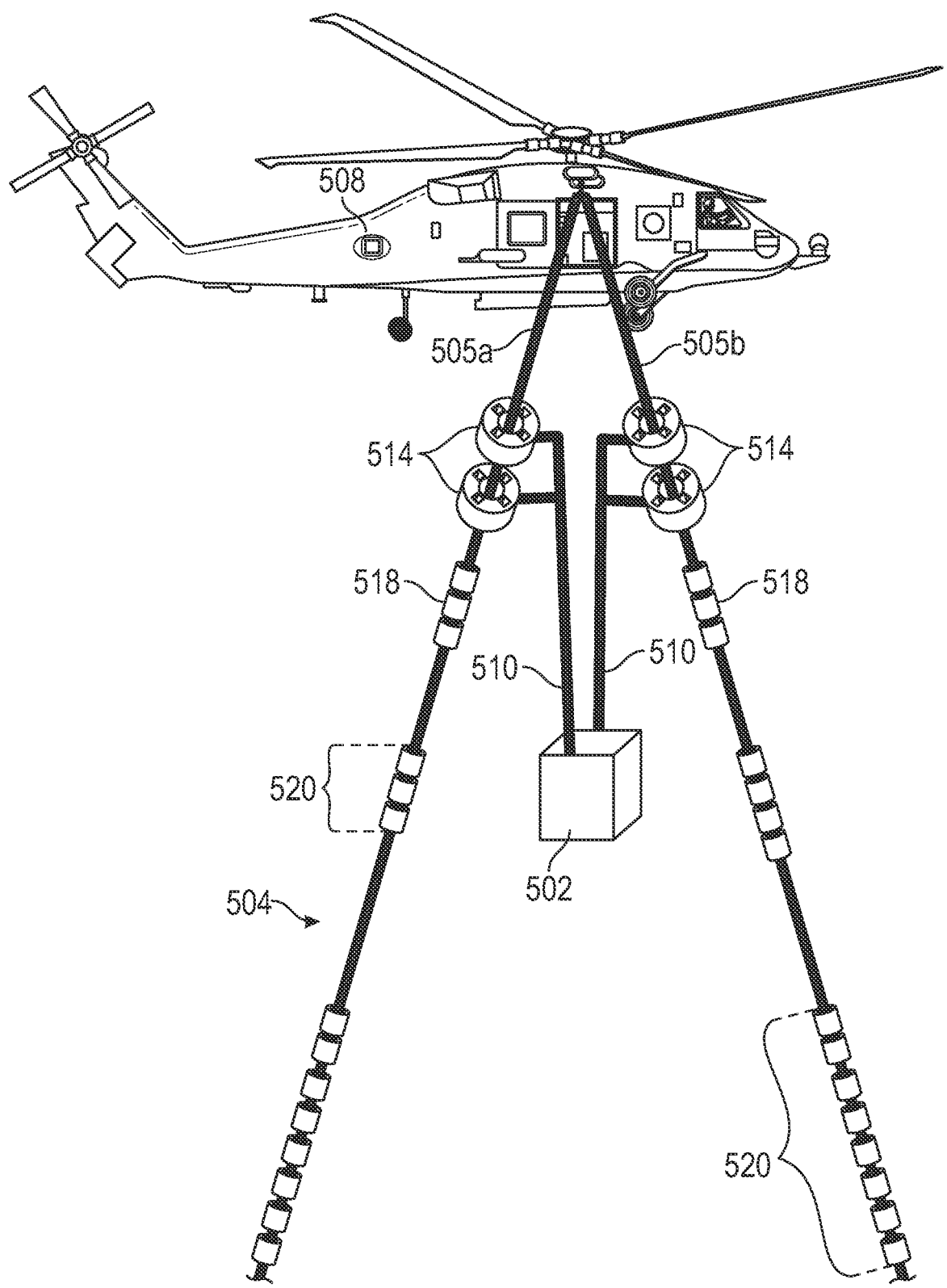
FIG. 5 illustrates an exemplary use case of the magnetic braking system for some embodiments.

In some embodiments, lanyard 110 comprises multiple collars and/or multiple connectors at the first end 112a and the second end 112b, respectively. For example, as illustrated in FIG. 5 below, lanyard 110 may comprise two collars 114 to increase the braking force acting on payload 102 relative to the braking force provided by a single collar. In some embodiments, additional collars 114 are disposed substantially adjacent to each other at first end 112a such that the adjacent collars are configured to attach to the same descending structure 104. Additional collars 114 may be employed to increase the relative size of the magnets. Increasing the relative size of the magnets may increase the area of the reaction force (i.e., the area on conductive bands 118 that the magnetic field of the magnets within collar 114 is projected), thereby increasing the magnitude of the braking force acting on payload 102. For example, when lowering furniture via system 100, it may be advantageous to couple multiple collars 114 to the payload 102 to generate a larger braking force. Thus, in some embodiments, a lanyard 110 may comprise a single connector 116 at second end 112b and multiple collars 114 at first end 112a, as illustrated in FIG. 5. Alternatively, or additionally, lanyard 110 may be first end 112a may be split into two or more distinct portions, with the two or more distinct portions having a collar 114 thereon, such that a single lanyard 110 may connect to multiple descending structures 104. Similarly, in some embodiments, lanyard 110 may comprise multiple connectors 116 for attaching to payload 102.

Connector 116 may be configured to couple to payload 102. For example, connector 116 may be a D-ring, a carabiner, a maillon, a lobster clasp, a rebar hook, a snap hook, or the like. Connector 116 may be selected based in part on the payload 102. For example, for large and/or bulky objects, connector 116 may be a harness, ratchet straps, or rope. In some embodiments, connector 116 is configured to attach to a quick-release mechanism on a tactical vest, such as tactical vests worn by military personnel. These tactical vests often have quick-release functionality that allows the wearer to remove the tactical vest or the attached lanyard 110 in a single motion by pulling on a tether or another release mechanism. Thus, when the user reaches distal end 106b, the tactical vest wearer may remove the tactical vest and, simultaneously, disconnect from lanyard 110 by actuating the quick release mechanism. In some embodiments, the connector 116 is configured to disconnect from the vest when the tether or release is pulled such that the collar 114 may be retrieved without also retrieving the vest. In other embodiments, connector 116 is configured to remain coupled to the tactical vest such that the tactical vest can be retrieved with the retrieval of the collar 114. Any of the above-described connectors may be used for attaching to a tactical vest having quick-release functionality. Broadly, connector 116 may be any mechanism configured to couple to payload 102 is within the scope hereof. For example, rope, cables, bungee cord, or the like could be used to attach to payload 102.

In some embodiments, multiple descending structures 104 are provided. For example, for materiel delivery out of a helicopter, two ropes may be provided. The two ropes may extend from the same origin point of the helicopter and form a V-shape when deployed (see FIG. 5). Alternatively, in some embodiments, the two ropes could be disposed substantially parallel to one another (see FIG. 4). Payload 102 may be connected to a first descending structure via a first lanyard and to the second descending structure via a second lanyard such that payload 102 is supported by both descending structures 104. Furthermore, multiple lanyards 110 may be connected to each descending structure 104 and to the payload 102 to increase the braking force applied thereto.

To generate the braking force with collar 114, a plurality of conductive bands 118 may be affixed to descending structure 104. In some embodiments, conductive bands 118 are formed as cylindrical tubes configured to receive descending structure 104. As discussed above, the relative motion of the magnets within collar 114 and conductive bands 118 causes the generation of eddy currents within conductive bands 118 that results in an opposing magnetic field and a drag force acting on collar 114, thereby slowing the descent of payload 102. Because the drag force is generated by electromagnetics rather than by friction from a person's body, a person may utilize system 100 hands-free. Conductive bands 118 may comprise a conductive material, such as aluminum, copper, silver, or stainless steel, in which eddy currents are generated as the magnets disposed within collar 114 translate past conductive bands 118. Broadly, conductive bands 118 may comprise any non-ferromagnetic metal or metal alloy based on their respective electrical conductivities. Metals with higher electrical conductivities will generate higher braking forces for system 100.

The use of collars 114 and conductive bands 118 described herein allows a user to configure system 100 to provide a desired rate of descent by the placement of conductive bands 118 at discrete locations along descending structure 104 and/or the use of one or more collars 114. Thus, as one example, system 100 can be configured to allow heavy objects (e.g., furniture, packages, material, vehicles, etc.) to descend slowly via employing multiple conductive bands 118 and/or collars 114, whereas the number of conductive bands 118 and or collars 114 may be fewer for a person (that is relatively lighter than heavy furniture or a vehicle) to descend. Other parameters may also be adjusted to control the descent of payload 102. As described above, the material of the magnet may be selected based on the magnetic flux density of the material. Increasing the magnetic flux density may increase the braking force magnitude. Furthermore, increasing the size of the magnets and/or the thickness of conductive bands 118 may increase the magnitude of the braking force. As discussed further below with respect to FIG. 3, conductive bands 118 may be tapered and increase in width from a proximal end to a distal end, and, in some embodiments, the taper and distance between conductive bands 118 may be configured to adjust the impulse velocity of the descent to reduce the gravitational forces acting on payload 102. Additionally, the material of conductive bands 118 may be selected to adjust the applied braking force; materials having a higher conductivity may provide a larger deceleration.

Conductive bands 118 may be affixed to an exterior of descending structure 104 and may be distributed longitudinally along descending structure 104. A user may affix conductive bands 118 at discrete locations along descending structure 104 based on where the user desires for the descent of payload 102 to be decelerated. For example, it may be desirable to place multiple conductive bands 118 near distal end 106b to ensure payload 102 does not strike the ground with excessive speed, which could lead to injury or damage. Similarly, near the proximal end 106a, the distance between conductive bands 118 may be substantially large to allow gravity to accelerate payload 102 towards the ground.

In some embodiments, conductive bands 118 may be affixed to descending structure 104 in sets 120, wherein a set 120 comprises a plurality of adjacent conductive bands 118, such that each band in a set abuts or is proximate to at least one other band in the set. Thus, a conductive band 118 or a set 120 of conductive bands 118 may be interspersed along the length of descending structure 104, such that descending structure 104 presents a first longitudinal length having no conductive bands, a second longitudinal length having a first set of one or more conductive bands, a third longitudinal length having no conductive bands, a second set of one or more conductive bands, and continuing the alternating no bands/set of bands for a length of the descending structure 104. In some embodiments, conductive bands 118 may be arranged in substantially evenly spaced sets along at least a portion of a length of descending structure 104 to provide a descent have repeated periods of free fall and braking applied to payload 102. A set of bands may be added to descending structure 104 to increase a length along descending structure 104 that the braking force is applied to payload 102. The width or diameter of conductive bands 118 may also be configured to adjust the provided braking force. Increasing the width of a conductive band 118 may increase the provided braking force.

In some embodiments, conductive bands 118 are integrated within descending structure 104. For example, conductive bands 118 may be woven or braided into a rope, such as a fast rope. In some such embodiments, conductive bands 118 may be solid structures, such as a cylinder. In some embodiments, conductive bands 118 are both located interior to descending structure 104 and exterior to descending structure 104. As discussed above, the location, frequency, width, and length of conductive bands 118 along descending structure 104 may be adjusted to adjust the braking force acting on collar 114. Further, it is contemplated that the magnets may be disposed within descending structure 104, and collar 114 may comprise the non-ferromagnetic material.

In some embodiments, descending structure 104 may be formed from a non-ferromagnetic material such that eddy currents are generated within descending structure 104 to slow payload 102. In some such embodiments, conductive bands 118 may be omitted from system 100. When descending structure 104 comprises a conductive material, payload 102 may descend at a constant terminal velocity. In still other embodiments, conductive bands 118 may be affixed to the non-ferrous metallic descending structure to increase the braking force of system 100.

Also illustrated in FIG. 1 is a retrieval system 122. Retrieval system 122 may be configured to propel collars 114 from a location along descending structure 104 (e.g., distal end 106b) to proximal end 106a. Retrieval system 122 may be disposed at any location along descending structure 104. In some embodiments, retrieval system 122 is used when only a single collar 114 descends down or along a descending structure 104 at a time. Retrieval system 122 may alleviate the need for a user to physically return collar 114 from distal end 106b back to proximal end 106a after a descent. In some embodiments, retrieval system 122 comprises a wheel 124, a spring 126, and an actuating mechanism (not shown). In some embodiments, wheel 124 is a rubber wheel; however, wheels of other materials are within the scope hereof. Wheel 124 and spring 126 may be coupled to collar 114. As collar 114 and wheel 124 travels down descending structure 104, wheel 124 may rotate and compress spring 126, storing energy therein. Spring 126 may be either a mechanical spring or a gas spring. When the user desires to retrieve the collar 114 at proximal end 106a, the user may engage the actuating mechanism (e.g., button, lever, pedal, etc.), which may be configured to release the energy stored in spring 126, thereby propelling collar 114 upward along descending structure 104. In some embodiments, the actuating mechanism is actuated by disconnecting lanyard 110 from payload 102. In some embodiments, the actuating mechanism is actuated by disconnecting collar 114 from first end 112a. Retrieval system 122 may be configured (e.g., by selection of spring 126) to move at an appropriate speed to prevent eddy current response resulting from collar 114 translating past conductive bands 118 during ascent thereof.

In some embodiments, multiple wheels 124 are provided for system 100. For example, two wheels 124 may be used and disposed on opposite sides of collar 114. Each wheel 124 may compress a separate spring 126. Alternatively, each wheel 124 may be configured to compress the same spring 126. When multiple wheels 124 are used for retrieval system 122, a single actuating mechanism may be used to actuate springs 126 simultaneously. In other embodiments, a distinct actuating mechanism is provided for each spring 126.

Other retrieval systems are contemplated for use with system 100. For example, collars 114 may have a through hole in the body thereof through which a cable or the like is received and coupled to supporting structure 108 at proximal end 106a. A retrieval system may be disposed proximal to supporting structure 108 and be configured to retract collars 114 back towards proximal end 106a. For example, the retrieval system may be configured as a pulley system for retracting collars 114 back up along descending structure 104.

A method for controlling the descent of a payload 102 using system 100 may proceed as follows. A plurality of conductive bands 118 may be provided. Conductive bands 118 may be provided in various lengths, widths, tapers, and materials such that the user can select conductive bands 118 to achieve a desired braking force. At least one lanyard 110 may also be provided for coupling payload 102 to descending structure 104. The plurality of conductive bands 118 may then be affixed to descending structure 104 at discrete locations along an exterior thereof based on the desired braking force. In some embodiments, the conductive bands 118 are integrated with descending structure 104, such as woven within a fast rope. The collar 114 may then be circumferentially attached to descending structure 104, and the connector 116 may be coupled to payload 102. Thereafter, payload 102 may descend along descending structure 104. As collar 114 translates past conductive bands 118, eddy currents generated within conductive bands 118 may result in a repelling magnetic field that provides the braking force to decelerate the descent of payload 102. Once at distal end 106b, collars 114 may be propelled back towards proximal end 106a using retrieval system 122.

Collar with Magnetic Assemblies

Figure 2A:
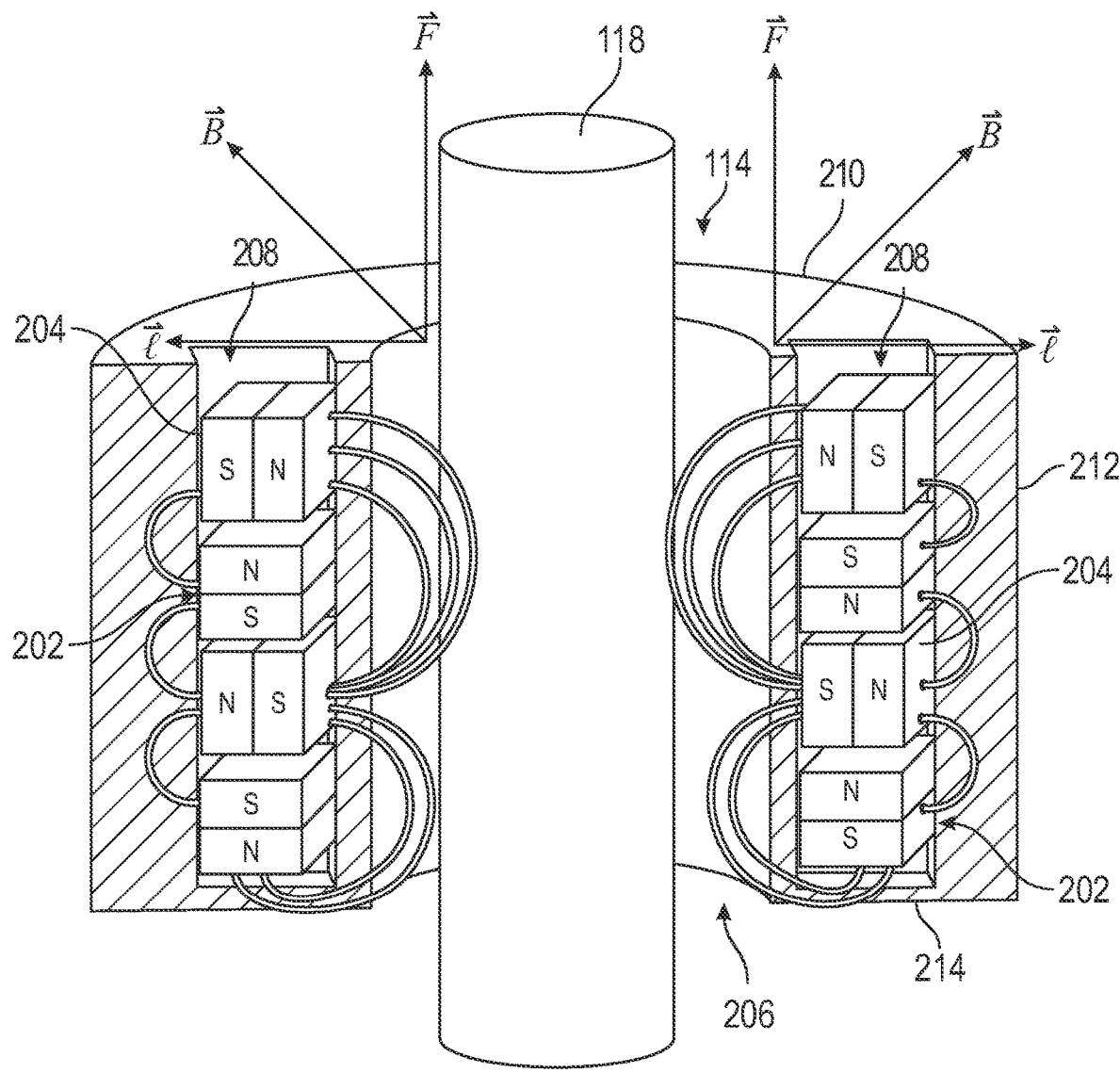
FIG. 2B illustrates the collar for some embodiments.
Figure 2B:
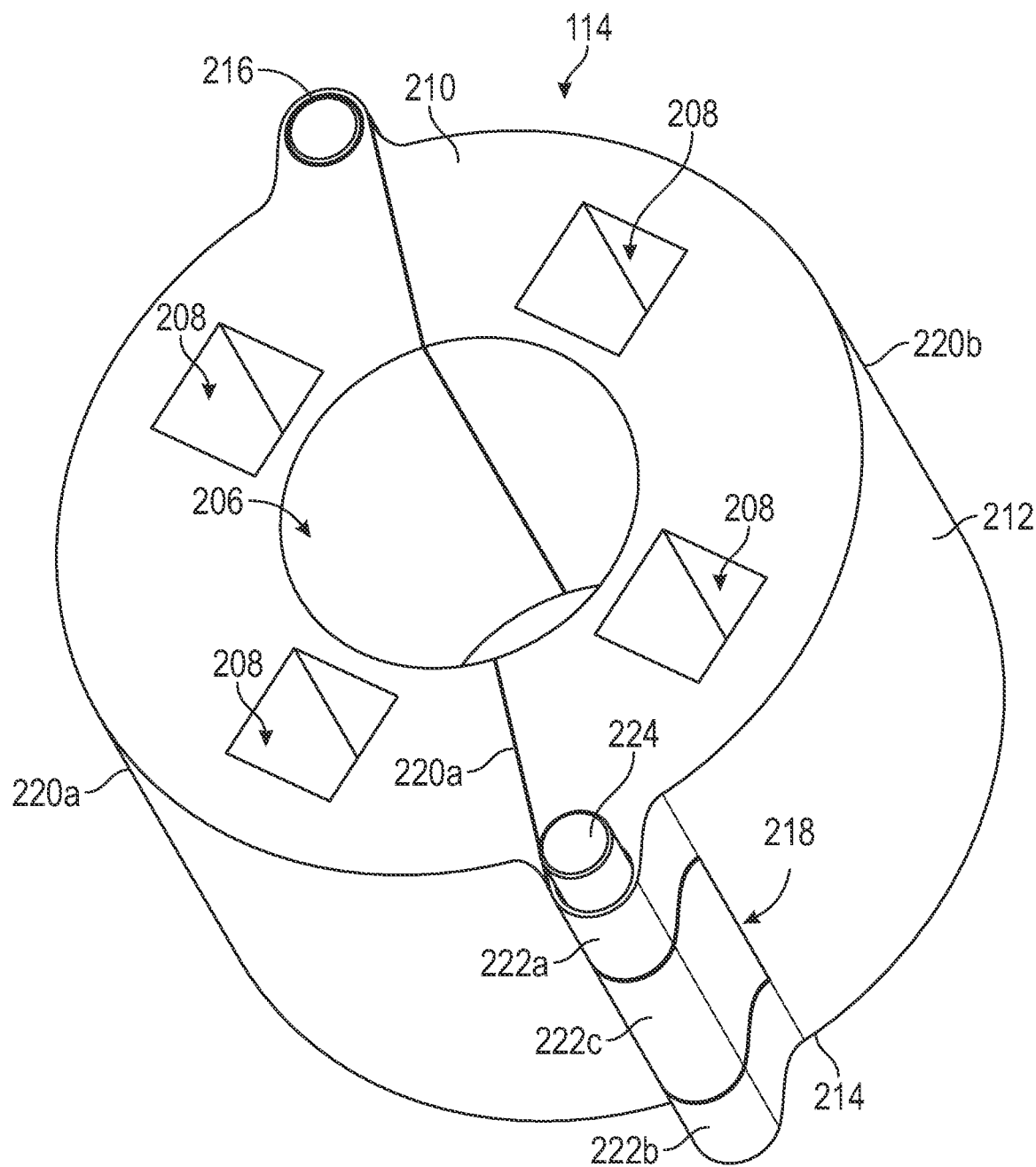

FIG. 2A schematically illustrates interactions between collar 114 and a conductive band 118 for generating the braking force for controlling the descent of payload 102 for some embodiments. As described above, collar 114 may house magnetic assemblies 202 therein. For clarity of illustration, a sectional view of collar 114 is presented, and two magnet assemblies 202 are illustrated; however, collar 114 may comprise additional magnet assemblies (e.g., four) in some embodiments, as depicted in FIG. 2B.

As previously discussed, when payload 102 descends and collar 114 translates past conductive bands 118, the relative motion therebetween results in the generation of eddy currents within conductive bands 118 that are induced by the magnetic field of the magnet assembly 202. The magnetic field attempts to retard the eddy currents, which provides a braking force substantially proportional to a velocity of collar 114. Magnet assemblies 202 may be oriented such that the magnetic field vectors (B and i) are directed substantially normal to conductive bands 118, and the retarding force (F) is directed substantially opposite to the force of gravity.

Each magnet assembly 202 may be configured as a linear Halbach array, which is a permanent magnet arrangement that enhances the magnetic field on a first side of the linear Halbach array and, on a second side of the linear Halbach array that is opposite the first side, concentrates the magnetic field to near zero. That is, the linear Halbach array may be configured such that a combined magnetic flux density of the linear Halbach array is largest at the first side, and a minimum magnetic flux density is present at the second side. The concentration may be increased on the first side by the addition of Halbach elements and the addition of a ferromagnetic band or strip to the second side of the linear Halbach array, as discussed further below. As discussed above, increasing the magnetic flux density of the magnet leads to an increase in the applied braking force. Thus, the use of linear Halbach arrays is highly advantageous to produce a substantial braking force to slow payload 102 such that payload 102 can descend in a controlled manner without risk of injury or damage. Each magnet in the linear Halbach array may repel adjacent magnets, thereby increasing the magnetic flux density on the strong side and decreasing the magnetic flux density on the weak side. By orienting the strong side of the linear Halbach array to project onto the conductive bands 118, a larger eddy current and resultant braking force may be produced. In some embodiments, the linear Halbach array may be formed by a plurality of block magnets 204, with each block magnet 204 in the array having a polarity rotated 90 degrees with respect to adjacent magnets. Various other angular rotations between adjacent magnets are within the scope hereof. For example, the angular rotation may be 45 degrees. Broadly, the angular rotation may be any degree ranging from 0 to 360 degrees. In some embodiments, at least one block magnet 204 on an end (i.e., a top magnet or a bottom magnet in a vertically-oriented assembly) of magnet assemblies 202 comprises a magnetic north or south pole directed perpendicularly or parallel to the strong side of the magnetic field. For example, if five block magnets 204 are used, each end of a magnet assembly 202 may comprise a magnetic pole directed perpendicularly or parallel to the enhanced side of the magnetic field.

Each block magnet 204 may be a permanent magnet. In some embodiments, block magnets 204 are one of a neodymium magnet, a samarium cobalt magnet, or any other strong permanent magnet. A stronger magnet may provide a higher braking force on payload 102. The plurality of block magnets 204 may be vertically oriented and stacked on top of one another. In some embodiments, block magnets 204 comprise a through hole for insertion of a rod (or other coupling mechanism) to help keep each block magnets 204 in magnet assemblies 202 in contact with adjacent block magnets 204.

Looking now at FIG. 2B, collar 114 is illustrated for some embodiments. As described above, collar 114 may comprise four magnet assemblies 202. The four magnet assemblies 202 may be spaced at ninety-degree intervals within collar 114. The equidistant spacing may provide for a substantially even braking force to act on collar 114. In other embodiments, the spacing between magnet assemblies 202 is not equal. For example, magnet assemblies 202 may be spaced closer together on a side of collar 114 such that said side experiences a larger braking force. Additional or fewer magnet assemblies 202 may be used within collar 114 in various embodiments. For example, as a weight of payload 102 increases, additional magnets may be used to increase the braking force to slow the descent payload 102. In some embodiments, collar 114 may comprise a number of magnet assemblies 202 in the range of two to four magnet assemblies.

Collar 114 may be substantially cylindrical or disc-shaped and have a hole 206 substantially through a center thereof. Collar 114 may take other geometrical shapes, such as rectangular or square, without departing from the scope hereof. In some embodiments, a geometry of hole 206 substantially matches a geometry of descending structure 104. Hole 206 may be a through hole such that descending structure 104 is received in hole 206, and collar 114 can be circumferentially attached to descending structure 104. A width of hole 206 may be sized based on a combined width of descending structure 104 and conductive bands 118 for circumferentially attaching collar 114 about descending structure 104 and conductive bands 118. It is advantageous to minimize a distance between magnet assemblies 202 and conductive bands 118, as decreasing the distance therebetween leads to larger eddy currents and a larger braking force acting on collar 114. As discussed below, conductive bands 118 may be tapered to increase a distance between magnet assemblies 202 and an outer surface of conductive bands 118 at a proximal end thereof to reduce impulse velocities acting on payload 102.

Collar 114 may comprise cavities 208 for receiving magnet assemblies 202 therein. Cavities 208 may extend from a proximal surface 210 of collar 114 and through a body 212 of collar 114 without presenting an opening on a distal surface 214. In some embodiments, cavities 208 are sized based on a size of block magnets 204. For example, cavities 208 may be dimensioned such that a magnet assembly 202 is substantially flush with the inner walls of the cavity 208. That is, a width of cavities 208 may be based on a width of magnet assemblies 202. In some embodiments, a depth of cavity 208 is based at least in part on a height of magnet assemblies 202. In some embodiments, an end block magnet 204 of a magnet assembly 202 is substantially flush with proximal surface 210. In some embodiments, the geometry of cavities 208 matches the geometry of block magnets 204. Cavities 208 may be spaced equidistantly within collar 114. In some embodiments, cavities 208 are spaced at 30, 45, 60, 90, 120, or 180 degree intervals within collar 114.

Collar 114 may comprise a cavity 208 corresponding to each magnet assembly 202. In some embodiments, additional cavities 208 are provided for adding additional magnet assemblies 202 to collar 114. Magnet assemblies 202 may be added to/removed from cavities 208 by the user to vary the desired braking force. As magnet assemblies 202 are removed from collar 114, the braking force may decrease. In some embodiments, magnet assemblies 202 are integral to collar 114 such that magnet assemblies 202 are non-removable from collar 114.

To attach to descending structure 104, collars 114 may comprise a clamshell clamp mechanism formed by a hinged portion 216 and a connector 218. Hinged portion 216 presents a first half 220a and a second half 220b of collar 114. Hinged portion 216 may be substantially opposite connector 218. Connector 218 may comprise a first portion 222a, a second portion 222b, and a third portion 222c. First portion 222a and second portion 222b may be disposed on first half 220a, and third portion 222c may be disposed on second half 220b. Portions 222a, 222b, 222c may be hollow and positioned in-line longitudinally such that a pin 224 may be inserted through each of the openings of portions 222a, 222b, 222c to close collar 114 about descending structure 104. In some embodiments, collar 114 comprises an actuating mechanism (not shown), such as a button, for detaching collar 114 from descending structure 104. For example, actuating a button on collar 114 may release pin 224 from portions 222a, 222b, 222c such that the user can remove collar 114 from descending structure 104.

Various other coupling means may be used for collar 114 without departing from the scope hereof. For example, a clasp mechanism or magnets may be used in place of connector 218. As another example, a snap fit may be used. In some embodiments, collar 114 is not hinged and instead may be inserted over descending structure 104 by sliding collar 114 thereon at one of ends 106a, 106b prior to securing proximal end 106a to supporting structure 108. In some embodiments, collars 114 are integrated with descending structure 104 such that collars 114 cannot be removed therefrom. In some embodiments, collar 114 is formed from a nonferrous material, such as aluminum, copper, stainless steel, brass, or the like.

In some embodiments, a ferromagnetic band (or strip) may be placed on an outer surface of the linear Halbach arrays to increase a concentration of the magnetic fields within the collars. For example, the ferromagnetic band may be placed on the weak side of the linear Halbach array. The ferromagnetic band can concentrate the magnetic flux density of the second side within itself. Addition of a ferromagnetic band may also minimize any incidental attraction between collar 114 and any other ferromagnetic materials that are in proximity. As one example, the use of a ferromagnetic band may be advantageous for military personnel carrying weapons that are made of ferromagnetic material to reduce incident attraction between collar 114 and the weapons. Similarly, the use of the ferromagnetic band may reduce incidental contact between collar 114 and a helicopter that comprises ferromagnetic materials.

In some embodiments, collar 114 is omitted from lanyard 110, and first end 112a only comprises the linear Halbach array. Such an arrangement may be useful for traversal along a slotted descending structure 104, such as a metal pipe extending outside along a high-rise building, for example. Because the linear Halbach array is inserted within the slotted metal pipe, the pipe may comprise an arbitrary thickness throughout. As such, in an event such as a fire or other catastrophe, persons unable to escape through the interior of the high-rise may place the linear Halbach array within the slotted pipe, attach themselves to lanyard 110, and safely descend along the exterior of the building. As discussed above, if the metal pipe is non-ferromagnetic, the requisite braking force may be provided by the pipe itself.

Conductive Bands

Figure 3:
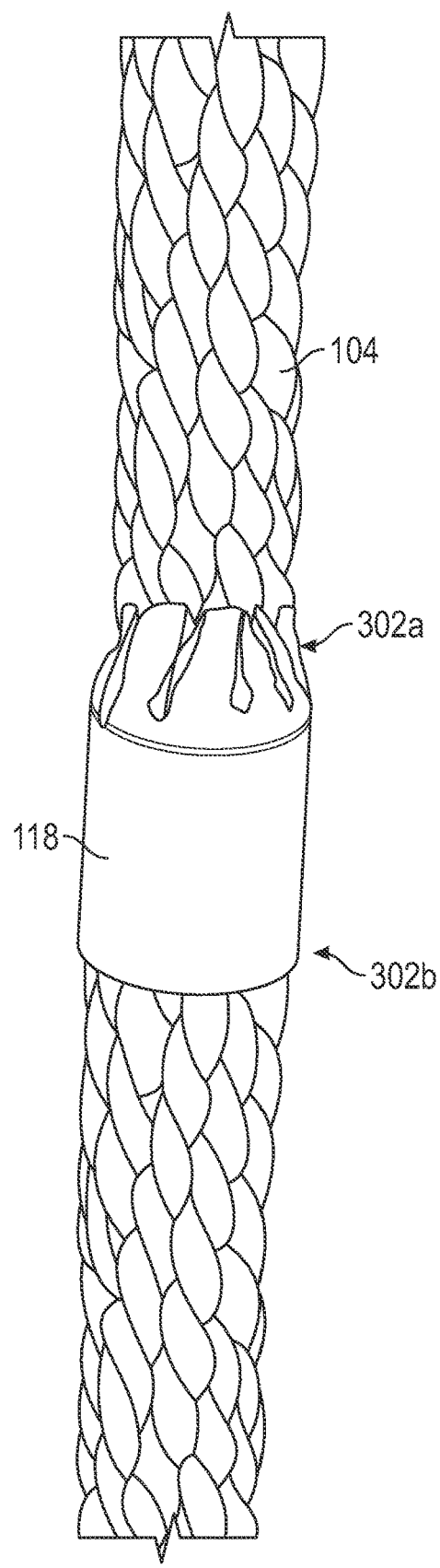
FIG. 3 illustrates the band affixed to a descending structure for some embodiments.

FIG. 3 illustrates a conductive band 118 on a descending structure 104 for some embodiments. Conductive band 118 may comprise a proximal end 302a oriented towards proximal end 106a of descending structure 104 and a distal end 302b oriented towards distal end 106b of descending structure 104. In some embodiments, conductive bands 118 are formed as substantially cylindrical tubes for receiving descending structure 104.

Conductive bands 118 may be affixed to an exterior of descending structure 104. In some embodiments, conductive bands 118 are configured to receive descending structure 104 and held in place at a desired location by friction. In some embodiments, proximal end 302a is indented, crimped, bent inwards, or cast towards descending structure 104 to strengthen a mechanical connection between conductive bands 118 and descending structure 104. Crimping conductive bands 118 may aid in collar 114 translating past conductive bands 118 without becoming snagged thereon. Furthermore, the indentation may function as a locking mechanism to prevent conductive bands 118 from sliding off descending structure 104. For example, without indenting proximal end 302a, distal surface 214 could become caught on proximal end 302a as collar 114 translates down descending structure 104, thereby altering the descent of payload 102. The indentation may be configured such that conductive bands 118 are held fixed at the location placed by the user during operation but are adjustable for the user to adjust the position of conductive bands 118 on descending structure 104 or to remove a conductive band 118 from descending structure 104. In some embodiments, proximal end 302a is chamfered or filleted to help prevent snagging of collar 114 on conductive bands 118. In some embodiments, an adhesive is applied to an inner surface of conductive bands 118 to aid in coupling conductive bands 118 to descending structure 104. In some embodiments, the inner surface of conductive bands 118 comprises a knurled, checkered, or otherwise textured surface to help keep conductive bands 118 affixed to descending structure 104.

In some embodiments, conductive bands 118 comprise a width that varies longitudinally along the band. That is, conductive bands 118 may be tapered, having a width that increases from proximal end 302a to distal end 302b. Tapering may also reduce impulse changes in velocity as collar 114 translates along conductive bands 118. Reducing the impulse velocity may prevent damage to supporting structure 108 and injury or damage to payload 102. Further, the taper may result in the initial deceleration force acting on payloads 102 near proximal end 302a to comprise a lower strength deceleration force (due to the smaller diameter of conductive bands 118 at proximal end 302a) than a full strength deceleration force as conductive band 118 tapers to the maximum diameter near distal end 302b. Reducing the impulse velocities also reduces the gravitational forces (gs) acting on payload 102, which leads to a smoother descent experience for the payload. In some embodiments, system 100 is configured to maintain a g-force of substantially one g. For inanimate payloads, system 100 may be configured to allow higher g-forces to act thereon. In some embodiments, conductive bands 118 comprise a taper of about 14% such that the diameter of the smallest cross-sectional area of conductive bands 118 (e.g., near proximal end 302a) is about 14% smaller than the diameter of the largest cross-sectional area of conductive bands 118 (e.g., near distal end 302b). For example, a 14% taper may be optimal for payloads of about 150 kilograms with a desired terminal velocity approximately 1-2 meters/second. The taper percentage to maintain the g-force near one may vary based on the mass of payload 102 and the length of the descent. As the mass increases, the taper percentage may also need to increase. Similarly, as the length of the fall increases, the taper percentage may also need to increase. Thus, the taper of conductive bands 118 may be selected based on the mass of payload 102 and the length of the descent. One of skill in the art will appreciate that the optimal taper percentage may change based on the above-described factors and the desired terminal velocity without departing from the scope hereof.

As described above, conductive band 118 may comprise a nonferrous metallic material, such as aluminum, brass, or copper, which may generate eddy currents as collar 114 translates along descending structure 104. In some embodiments, conductive bands 118 are configured to couple to other conductive bands 118 to form a set 120 along descending structure 104. For example, conductive bands 118 may comprise protrusions on proximal end 302a and corresponding openings on distal end 302b such that the protrusions on one band can be inserted into the openings on an adjacent band to couple the two bands to one another. As another example, conductive bands 118 may be coupled by a locking collar having an adjustable diameter. The diameter may be adjusted by a set screw, for example. As such, conductive bands 118 may be used on descending structures 104 of various widths, and the locking collar can adjust the diameter of a conductive band 118 based on the width of the descending structure 104.

EXEMPLARY EMBODIMENTS

Some exemplary embodiments of the present disclosure will now be discussed. It will be appreciated that the present disclosure is not limited to these exemplary embodiments, and that system 100 may have various uses to control the translation of a payload. For example, system 100 may be useful to provide an egress method out of a high-rise building.

Figure 4:
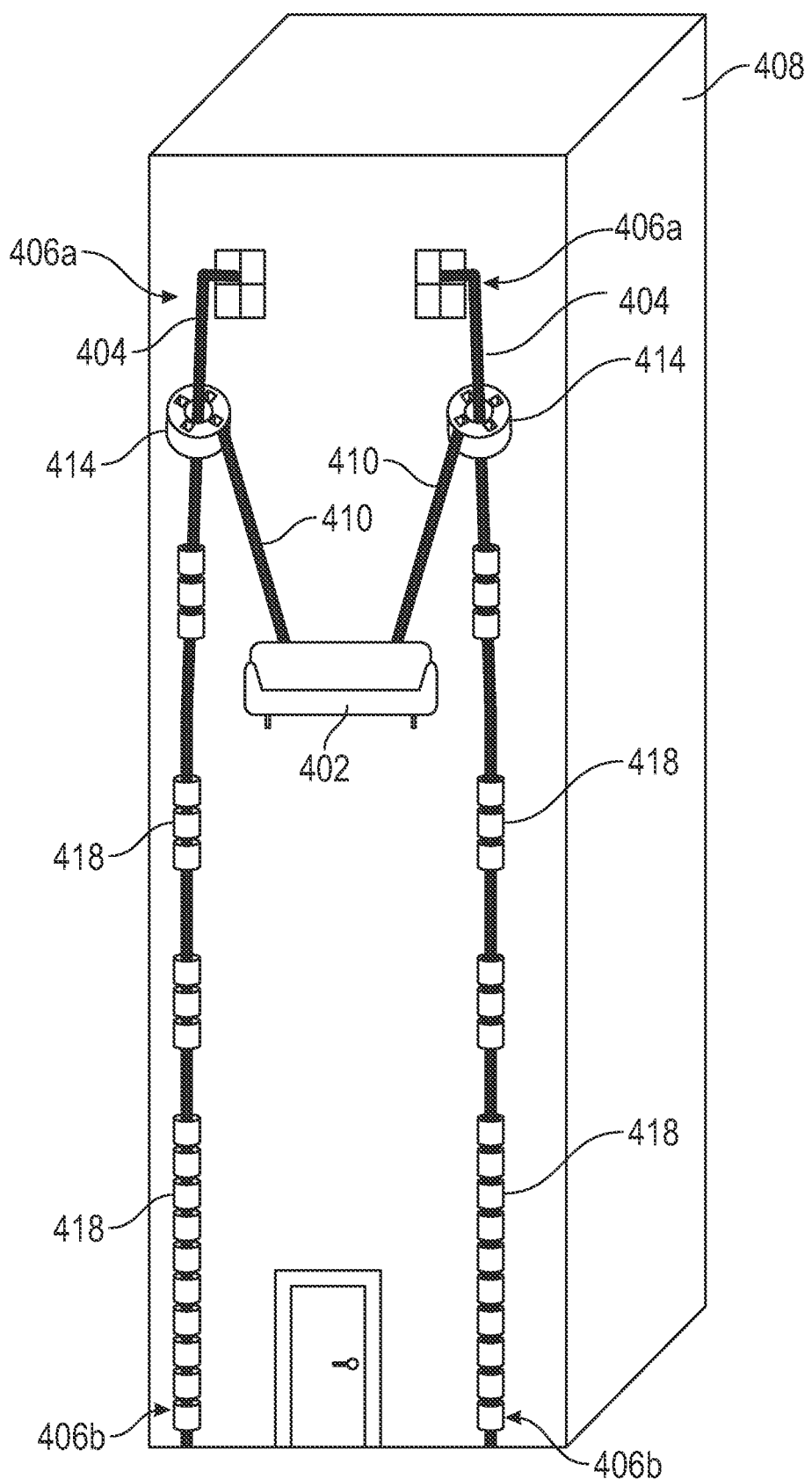
FIG. 4 illustrates an exemplary use case of the magnetic braking system for some embodiments.

FIG. 4 depicts an exemplary embodiment of moving furniture 402 (i.e., a payload) out of a building 408 using system 100. In this exemplary embodiment, building 408 functions as the supporting structure for system 100, with proximal ends 406a of descending structures 404 secured to building 408, with a respective pair of lanyards 410 coupling descending structure 404 to furniture 402. As previously discussed, coupling a payload to more than one descending structure 404 may be advantageous to provide additional braking and/or mechanical support for the payload during the descent. Similarly, multiple lanyards 410 and/or collars 414 may be used to support a payload based in part on the weight thereof. As discussed above with respect to FIG. 1, multiple lanyards 410 may also be provided such that multiple payloads may be lowered out of building 408 without having to retrieve a lanyard 410 once the lanyard 410 reaches distal end 406b of descending structure 404.

FIG. 4 also illustrates the use of additional conductive bands 418 as compared to FIG. 1. As conductive bands 418 are added to descending structure 404, the velocity of the payload may slow due to the additional eddy currents generated, which may be useful as the size and/or weight of the payload increases. Further, because additional conductive bands 418 may be removed and added to descending structure 404 by the user, system 100 may be easily adjusted based on the weight of the payload.

A second exemplary embodiment is illustrated in FIG. 5, wherein materiel, such as military supplies, is being delivered via system 100 out of a helicopter. In this exemplary embodiment, a V-shaped rope is being used as descending structure 504. The V-shaped rope may be formed by a single rope or may be formed by two ropes secured near the same supporting point on supporting structure 508. A first collar 514 may couple to a first leg 505a of the V-shaped rope, and a second collar 514 may couple to a second leg 505b of the V-shaped rope to support a payload 502. The first collar and the second collar may be a part of the same lanyard 510, or distinct lanyards 510 may be used. As described above, sets 520 of conductive bands 518 may be used to slow the descent of payload 502 at a discrete location along descending structure 504.

One of skill in the art will appreciate the numerous embodiments in which system 100 may be used to control the descent of a payload against gravity. Other exemplary use cases include, but are not limited to, mountain climbing, tower climbing, utility work, and the like where a worker is attached to the rope as a fall-prevention mechanism. It is contemplated that the worker may attach to the rope via collar 114, and conductive bands 118 may be affixed thereto such that, in the event of a fall, the worker is slowly descended towards the surface to prevent fall-related injuries. As another example, the magnetic braking system 100 may be used to lower an immobilized person out of a building or other elevated place.

Furthermore, it is contemplated that system 100 may be used to slow the movement of a payload when the payload is not moving co-linearly with the force of gravity. As one non-limiting example, a payload could be pulled in a substantially lateral direction (i.e., parallel to the ground and orthogonal to the force of gravity) and attached to a descending structure oriented laterally via a lanyard as described above, and have the movement thereof slowed by the braking force generated from the eddy currents generated within the conductive bands. The orientation of the linear Halbach arrays may match an orientation of the descending structure. Thus, for a lateral translation application in which descending structure 104 is oriented horizontally, the linear Halbach array may be oriented horizontally.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A magnetic braking system for controlling a descent of a payload, comprising:
    a plurality of conductive bands configured to be coupled with a descending structure and distributed longitudinally along the descending structure; and
    a lanyard for connecting the payload to the descending structure, comprising:
        a collar at a first end, the collar configured to attach to the descending structure,
        wherein the collar comprises a plurality of magnet assemblies,
        wherein upon descent of the payload via the magnetic braking system, the plurality of magnet assemblies induces eddy currents within the plurality of conductive bands, thereby generating a braking force to decelerate the payload during the descent; and
        a second end comprising a connector for connecting to the payload.

2. The magnetic braking system of claim 1,
    wherein each magnet assembly of the plurality of magnet assemblies comprises a first side and a second side opposite the first side,
    wherein each magnet assembly is arranged as a linear Halbach array to enhance a magnetic flux density of the magnet assembly on the first side and reduce the magnetic flux density on the second side, and
    wherein the first side is oriented towards a center of the collar.

3. The magnetic braking system of claim 1,
    wherein the plurality of magnet assemblies are spaced equidistantly within the collar.

4. The magnetic braking system of claim 1, wherein the plurality of conductive bands is distributed longitudinally along the descending structure at a plurality of discrete locations to generate the braking force on the collar at each discrete location.

5. The magnetic braking system of claim 1, wherein the collar comprises:
    a hinge and a clamshell clamp for attaching to the descending structure; and a plurality of cavities configured to house the plurality of magnet assemblies.

6. The magnetic braking system of claim 1,
wherein each conductive band comprises a proximal end and a distal end, and
wherein each conductive band comprises a tapered diameter that increases from the proximal end to the distal end.

7. The magnetic braking system of claim 1, further comprising:
a retrieval system disposed proximate to a distal end of the descending structure and configured to propel the collar from the distal end to a proximal end of the descending structure, the retrieval system comprising:
a spring;
at least one wheel configured to compress the spring when rotated by the collar,
wherein releasing the spring causes the collar to be propelled from the distal end of the descending structure to the proximal end of the descending structure.

8. The magnetic braking system of claim 1, wherein the lanyard comprises an additional collar at the first end to increase a magnitude of the braking force.

9. The magnetic braking system of claim 1, wherein the plurality of conductive bands is configured to be coupled to an exterior of the descending structure.

10. A method for controlling a descent of a payload using a magnetic braking system, comprising:
providing a plurality of conductive bands, each conductive band of the plurality of conductive bands comprising a non-ferromagnetic metal;
providing at least one lanyard, the at least one lanyard comprising:
a collar at a first end, the collar comprising a plurality of magnet assemblies and configured to attach to a descending structure; and
a connector at a second end configured to attach to the payload;
affixing the plurality of conductive bands at a plurality of discrete positions along an exterior of the descending structure; and
attaching the collar to the descending structure and the connector to the payload to connect the payload to the descending structure,
wherein when the payload descends along the descending structure, the plurality of conductive bands interacts with the plurality of magnet assemblies to generate eddy currents, and
wherein the eddy currents oppose a magnetic field of the plurality of magnet assemblies, providing a braking force to decelerate the descent of the payload.

11. The method of claim 10, further comprising attaching an additional lanyard to the payload to increase a magnitude of the braking force.

12. The method of claim 11, wherein the method further comprises:
providing an additional descending structure; and
attaching an additional collar of the additional lanyard to the additional descending structure to increase a magnitude of the braking force applied to the payload.

13. The method of claim 10, further comprising affixing an additional conductive band of the plurality of conductive bands adjacent to a discrete position of the plurality of discrete positions to increase a length along the descending structure that the braking force is applied to the payload.

14. A magnetic braking system for controlling a descent of a payload, comprising:
a plurality of conductive bands configured to be circumferentially affixed to an exterior of a fast rope and configured to be distributed longitudinally along the fast rope; and
a lanyard configured to connect the payload to the fast rope, the lanyard comprising:
a collar at a first end of the lanyard, the collar configured to attach to the fast rope,
wherein the collar comprises a plurality of magnet assemblies configured to generate eddy currents within the plurality of conductive bands as the collar translates along the fast rope,
wherein the eddy currents oppose a magnetic field of each magnet assembly of the plurality of magnet assemblies, providing a braking force for decelerating the payload,
wherein each magnet assembly of the plurality of magnet assemblies is formed as a linear Halbach array comprising a strong side magnetic field oriented towards the plurality of conductive bands; and
a connector at a second end of the lanyard, the connector configured to attach to the payload.

15. The magnetic braking system of claim 14,
wherein each conductive band of the plurality of conductive bands comprises a longitudinal taper to reduce impulse velocity of the descent.

16. The magnetic braking system of claim 14,
wherein the plurality of magnet assemblies comprises four magnet assemblies, and
wherein the four magnet assemblies are spaced equidistantly within the collar.

17. The magnetic braking system of claim 14, wherein each conductive band of the plurality of conductive bands comprises one of copper, stainless steel, or aluminum.

18. The magnetic braking system of claim 14,
wherein each conductive band of the plurality of conductive bands comprises a proximal end and a distal end, and
wherein a width of each conductive band increases from the proximal end to the distal end.

19. The magnetic braking system of claim 14, wherein the connector comprises one of a carabiner, a maillon, a lobster clasp, a rebar hook, or a snap hook.

20. The magnetic braking system of claim 14, wherein the lanyard comprises an additional collar at the first end configured to attach to the fast rope and to increase a magnitude of a braking force on the payload.

* * * * *